United States Patent
Osada (10) Patent No.: US 9,602,706 B2
(45) Date of Patent: Mar. 21, 2017

(54) ROTATABLE OPERATING MEMBER AND ELECTRONIC DEVICE HAVING THE SAME

(71) Applicant: CANON KABUSHIKI KAISHA, Tokyo (JP)

(72) Inventor: Yoichi Osada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/952,518

(22) Filed: Nov. 25, 2015

(65) Prior Publication Data

US 2016/0156827 A1   Jun. 2, 2016

(30) Foreign Application Priority Data

Dec. 1, 2014  (JP) ................. 2014-243242
Sep. 11, 2015  (JP) ................. 2015-179613

(51) Int. Cl.
*H04N 5/225*   (2006.01)
(52) U.S. Cl.
CPC .................. *H04N 5/2254* (2013.01)
(58) Field of Classification Search
CPC .......... H04N 5/2254; H04N 5/23209
See application file for complete search history.

(56) References Cited

U.S. PATENT DOCUMENTS

| | | | | |
|---|---|---|---|---|
| 4,707,083 A | * | 11/1987 | Iizuka | .............. G02B 7/04 359/700 |
| 8,950,339 B2 | | 2/2015 | Turmeau et al. | |
| 2002/0083769 A1 | | 7/2002 | Peterlechner et al. | |
| 2003/0173119 A1 | | 9/2003 | Spark et al. | |
| 2005/0168619 A1 | * | 8/2005 | Osada | .............. H01H 13/12 348/335 |
| 2014/0263986 A1 | | 9/2014 | Fukui | |

FOREIGN PATENT DOCUMENTS

| | | |
|---|---|---|
| CN | 100580384 C | 1/2010 |
| DE | 196 11 983 C1 | 7/1997 |
| DE | 102 11 155 A1 | 9/2003 |
| EP | 0 819 913 A1 | 1/1998 |
| JP | 05-203465 A | 8/1993 |
| JP | 2007-064665 A | 3/2007 |

OTHER PUBLICATIONS

German Office Action issued in Application No. 10 2015 120 720.6 on Jul. 8, 2016, with an English Translation.
Jan. 11, 2017 Taiwanese Notice of Allowance, without an English Translation, that issued in Taiwanese Patent Application No. 104139680.

* cited by examiner

*Primary Examiner* — Tuan Ho
(74) *Attorney, Agent, or Firm* — Cowan, Liebowitz & Latman, P.C.

(57) ABSTRACT

A rotatable operating member which reduces manufacturing costs and prevents false detection of a rotation angle has a member and a sheet. The member has a circumferential surface, and the sheet is fixed to the circumferential surface of the member. A reflectivity of a surface of the sheet is different from a reflectivity of the circumferential surface of the member. The sheet has a plurality of holes with width A formed side by side in a circumferential direction and the sheet is fixed such that a gap with width A is provided between both ends of the sheet in the circumferential direction. A part of the circumferential surface is regularly exposed from the holes and the gap in a circumferential direction of the member.

16 Claims, 7 Drawing Sheets

ROTATABLE OPERATING MEMBER AND ELECTRONIC DEVICE HAVING THE SAME

BACKGROUND OF THE INVENTION

Field of the Invention

The invention relates to a rotatable operating member and an electronic device having the same, and in particular to a technique for detecting rotation of an operating member which an electronic device has.

Description of the Related Art

An electronic device is equipped with various operating members such as a pushbutton type, a sliding type, and a rotary type so as to implement various processes and operations. A variety of sensors are used as means for detecting operation of such operating members when they are operated. For example, a technique for detecting rotation of a rotatable ring, which is an exemplary rotary operating member, using photo-reflectors has been proposed (see Japanese Laid-Open Patent Publication (Kokai) No. 2007-64665).

Specifically, reflective surfaces with different reflectivities are alternately provided at intervals of predetermined rotation angles on a rotatable ring, and when the rotatable ring is operated, photo-reflectors are selectively turned on and off (light is received/light is not received). As a result, rotation of the rotatable ring is detected. Here, ways to provide reflective surfaces with different reflectivities on the rotatable ring include a way in which reflective surfaces are directly formed on an inner peripheral surface of an annular member, and a way in which reflective sheets are attached to an inner peripheral surface of an annular member.

However, if a rotatable ring is manufactured by directly forming reflective surfaces with different reflectivities on an annular member, a problem of increasing manufacturing (machining) costs will arise. On the other hand, when a rotatable ring is manufactured by attaching reflective sheets to an annular member, manufacturing costs are reduced as compared to the case where reflective surfaces are directly formed on an annular member. However, for a rotatable ring that is able to make a 360-degree turn, it is necessary to attach reflective sheets to an inner peripheral surface of an annular member over the whole circumference. On this occasion, if a minuscule gap is formed at a joint between the reflective sheets, or if there is a minuscule overlap at a joint of the reflective sheets, variations in reflectivity are not regular, and this may cause causes false detection when a rotation angle is detected.

SUMMARY OF THE INVENTION

The invention provides a rotatable operating member which reduces manufacturing costs and prevents false detection of a rotation angle.

Accordingly, a first aspect of the invention provides a rotatable operating member comprising a member configured to have a circumferential surface and a sheet configured to be fixed to the circumferential surface, wherein a reflectivity of a surface of the sheet is different from a reflectivity of the circumferential surface of the member, wherein the sheet has a plurality of holes formed side by side in a circumferential direction in the circumferential surface, wherein in the sheet, a part of the circumferential surface of is exposed from the holes, and the sheet is fixed to the circumferential surface such that both ends of the sheet are opposed to each other in the circumferential direction, and wherein a gap with a width in the circumferential direction substantially equal to a width of the hole in the circumferential direction is provided between both ends of the sheet.

Accordingly, a second aspect of the invention provides a rotatable operating member comprising a member configured to have a circumferential surface and a sheet configured to be fixed to the circumferential surface, wherein the sheet has a first reflective area with a first reflectivity and a second reflective area with a second reflectivity, wherein a difference between a reflectivity of the circumferential surface and the second reflectivity is smaller than a difference between the first reflectivity and the second reflectivity, wherein the sheet is fixed to the circumferential surface such that the first reflective area and the second reflective area are arranged alternately in the circumferential surface in a circumferential direction, and both ends of the sheet are opposed to each other in the circumferential direction, wherein a gap with a width in the circumferential direction substantially equal to a width of the second reflective area in the circumferential direction is provided between both ends of the sheet, and wherein the gap is sandwiched by the first reflective area of the sheet.

Accordingly, a third aspect of the invention provides an electronic device comprising a member configured to have a circumferential surface, a sheet configured to be fixed to the circumferential surface and an output unit configured to project light toward the sheet, receive light reflected on the sheet, and output a signal based on the received light, wherein a reflectivity of a surface of the sheet is different from a reflectivity of the circumferential surface of the member, wherein the sheet has a plurality of holes formed side by side in a circumferential direction in the circumferential surface, wherein in the sheet, a part of the circumferential surface of is exposed from the holes, and the sheet is fixed to the circumferential surface such that both ends of the sheet are opposed to each other in the circumferential direction, and wherein a gap with a width in the circumferential direction substantially equal to a width of the hole in the circumferential direction is provided between both ends of the sheet.

Accordingly, a fourth aspect of the invention provides an electronic device comprising a member configured to have a circumferential surface, a sheet configured to be fixed to the circumferential surface and an output unit configured to project light toward the sheet, receive light reflected on the sheet, and output a signal based on the received light, wherein the sheet includes a first reflective area with a first reflectivity and a second reflective area with a second reflectivity, wherein a difference between a reflectivity of the circumferential surface and the second reflectivity is smaller than a difference between the first reflectivity and the second reflectivity, wherein the sheet is fixed to the circumferential surface such that the first reflective area and the second reflective area are arranged alternately in the circumferential surface in a circumferential direction, and both ends of the sheet are opposed to each other in the circumferential direction, wherein a gap with a width in the circumferential direction substantially equal to a width of the second reflective area in the circumferential direction is provided between both ends of the sheet, and wherein the gap is sandwiched by the first reflective area of the sheet.

According to the invention, manufacturing costs of the rotatable member are reduced. Also, false detection is prevented when a rotation angle of the operating member is detected.

Further features of the invention will become apparent from the following description of exemplary embodiments with reference to the attached drawings.

DESCRIPTION OF THE EMBODIMENTS

Hereafter, embodiments according to the invention will be described in detail with reference to the drawings.

Figure 1:
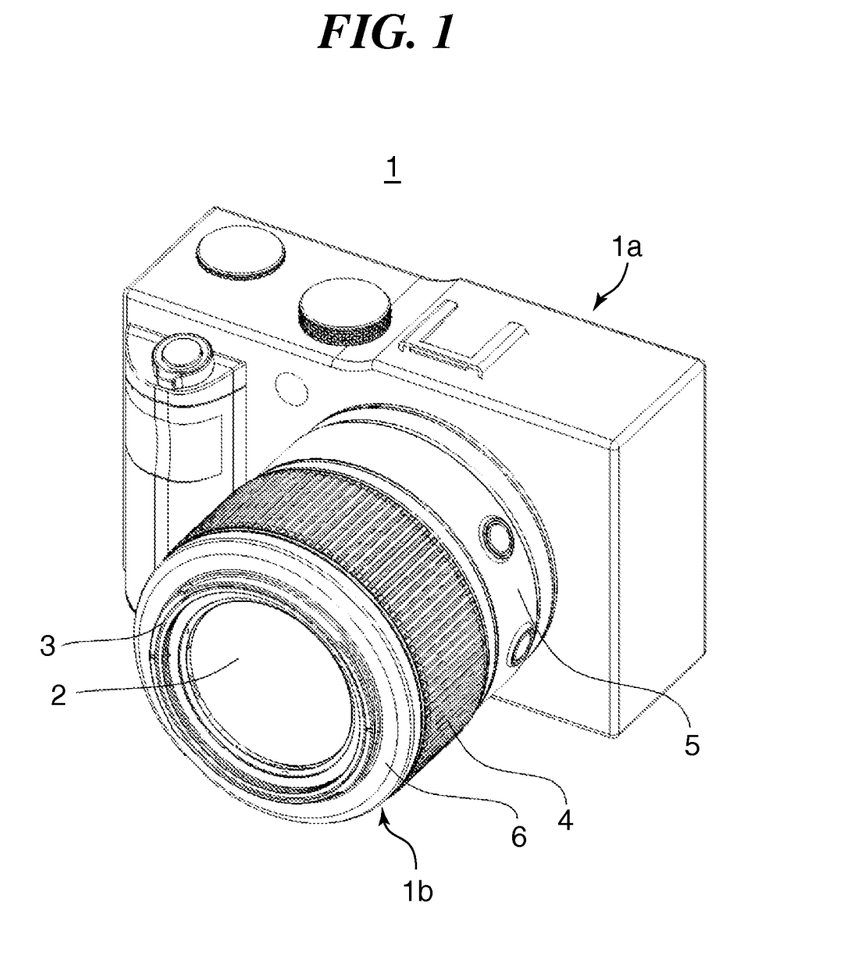
FIG. 1 is a perspective view showing an appearance of an image pickup apparatus which is an exemplary electronic device according to embodiments of the invention.

FIG. 1 is a perspective view showing an appearance of an image pickup apparatus 1 according to embodiments of the invention. The image pickup apparatus 1 is an exemplary electronic device according to the invention. The image pickup apparatus 1 is comprised mainly of a main body unit 1a and a cylindrical unit 1b. The main body unit 1a has an image pickup device, an image processing circuit, a signal processing circuit, a memory card, and so forth, which are not shown in the figure. The image pickup device subjects an optical image of an object to photoelectric conversion. The image processing circuit converts an analog signal, which is output from the image pickup device, into a digital image signal and performs predetermined image processing on the digital image signal to generate image data. The signal processing circuit detects rotation of a rotatable ring 4, to be described later, in accordance with signals from photo-reflectors 10a and 10b (see FIG. 4), to be described later, which are provided in the cylindrical unit 1b. The memory card stores image data output from the image processing circuit.

The cylindrical unit 1b is disposed near the center of a front side of the main body unit 1a. The cylindrical unit 1b has an image pickup lens 2 and a barrel 3. The image pickup lens 2 forms an object image which is to be formed on the image pickup device. The barrel 3 has a shutter device and a diaphragm device, not shown, which control the amount of light reaching the image pickup device.

Figure 2A:
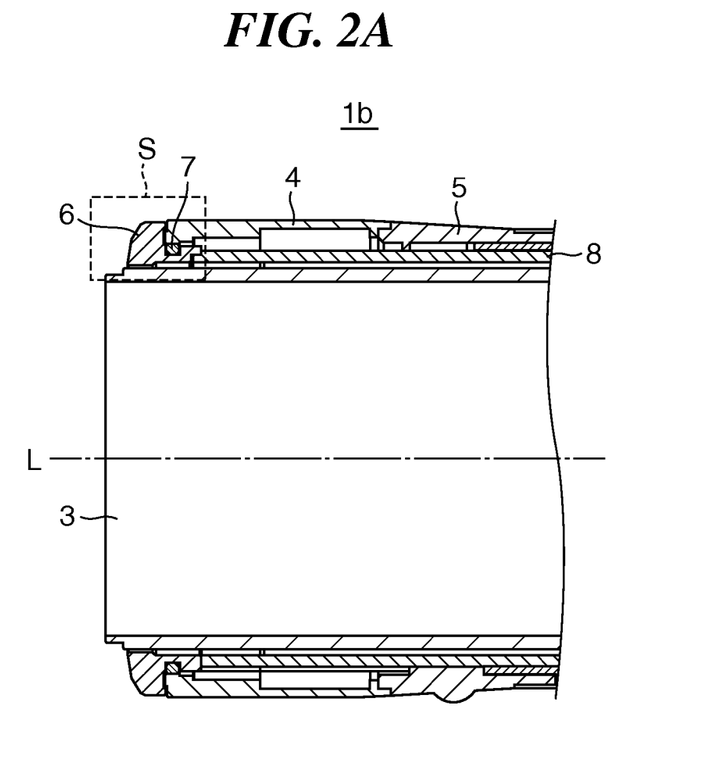
FIG. 2A is a cross-sectional view schematically showing an arrangement of a cylindrical unit constituting the image pickup apparatus in FIG. 1.

The rotatable ring 4 according to a first embodiment of the invention, a cylinder exterior 5, and a cap 6 are provided on an outer periphery of the cylindrical unit 1b. The rotatable ring 4 is a rotatable operating member which is operated to control the sensitivity of the image pickup device and change various image pickup parameters such as shutter speed. In the image pickup apparatus 1, image pickup parameters of which setting values are changeable by operating the rotatable ring 4 are allowed to be set in advance using a setting means, not shown. Thus, setting values of desired image pickup parameters set in advance are changeable by rotating the rotatable ring 4. It should be noted that description of the cap 6 and the cylinder exterior 5 will be given later with reference to FIG. 2. Also, description of other component elements of the image pickup apparatus 1 is omitted since they are not directly related to the invention.

Figure 2B:
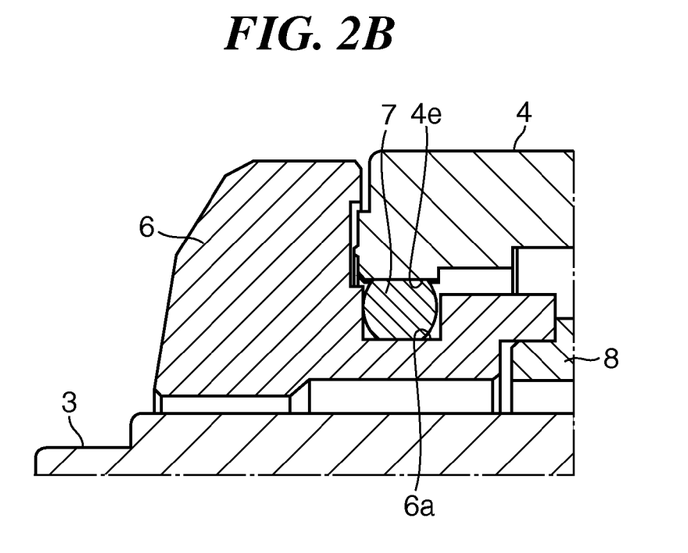
FIG. 2B is a partially enlarged view showing the cylindrical unit in FIG. 2A.

FIG. 2A is a cross-sectional view schematically showing a structure of the cylindrical unit 1b. FIG. 2B is a partially enlarged view showing an area S in FIG. 2A. Parts such as the image pickup lens 2 disposed inside the barrel 3 are omitted from FIGS. 2A and 2B since they are not directly related to the invention.

The cylindrical unit 1b has a base member 8 disposed on an outer periphery of the barrel 3. The cap 6 is disposed at an end of the base member 8 (on the object side). The rotatable ring 4 and the cylinder exterior 5 are disposed on an outer periphery of the base member 8. The cylinder exterior 5 and the base member 8 are fixed to the main body unit 1a via parts, not shown. The cap 6 are fixed to the main body unit 1a via the base member 8 by a screw, not shown, so that the rotatable ring 4 can be caught between the cap 6 and the cylinder exterior 5. The rotatable ring 4 is sandwiched between the cylinder exterior 5 and the cap 6 in a direction of an optical axis L of the barrel 3, and hence movement of the rotatable ring 4 in the direction of the optical axis L other than predetermined play is inhibited. However, movement of the rotatable ring 4 is not inhibited in a direction of rotation about the optical axis L and is able to make a 360-degree turn.

A groove 6a is formed on the cap 6. A ring member 7 made of a rubber material, which is an exemplary resin material, is fitted in the groove 6a. An inner diameter of the ring member 7 alone is smaller than an outer diameter of the groove 6a, and hence the ring member 7 is fitted into the groove 6a while being extended. Where the rotatable ring 4 is sandwiched between the cylinder exterior 5 and the cap 6 in the direction of the optical axis L, the ring member 7 is urged (pressurized) and compressed in a direction perpendicular to the direction of the optical axis L (radial direction) by projecting portions 4e provided on the rotatable ring 4. The projecting portions 4e are provided at three positions on an inner periphery of the rotatable ring 4 at substantially regular intervals in a circumferential direction, and as a result, the ring member 7 is urged in a well-balanced manner by the projecting portions 4e. Urging of the ring member 7 by the projecting portions 4e adds a predetermined operational load to the rotatable ring 4 when the rotatable ring 4 is rotated, and this prevents the rotatable ring 4 from being carelessly rotated and improves the ease of operation. It should be noted that the projecting portions 4e may be provided at four or more positions.

Figure 3A:
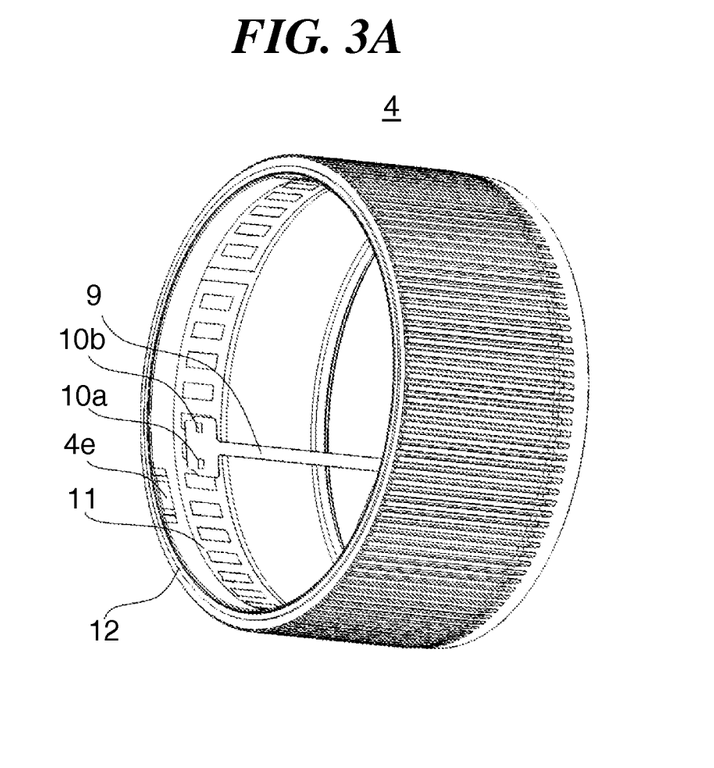
FIG. 3A is a perspective view showing a rotatable ring according to a first embodiment of the invention.
Figure 3B:
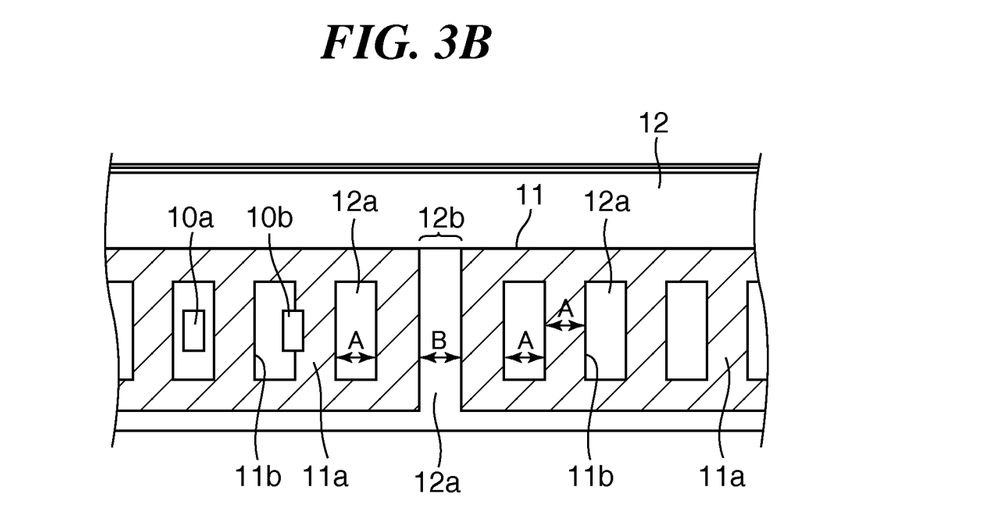
FIG. 3B is a developed plan view showing an inner peripheral surface of the rotatable ring in FIG. 3A.

FIG. 3A is a perspective view showing the rotatable ring 4. FIG. 3B is a developed plan view showing an inner peripheral surface (circumferential surface) of the rotatable ring 4. The rotatable ring 4 has an annular member 12, and a sheet 11 attached to an inner peripheral surface of the annular member 12.

The annular member 12 is manufactured by, for example, grinding an aluminum member. An outer periphery of the annular member 12 is uneven, and its surface is finished to be rough by a blasting process. This inhibits a finger from slipping when holding an outer peripheral surface of the rotatable ring 4 to rotate the rotatable ring 4 and improves the ease of operation. At least an area to which the sheet 11 is attached on the inner peripheral surface of the annular member 12 is finished to be a glossy surface 12a which is an exemplary surface with high reflectivity.

The sheet 11 is attached to the inner peripheral surface of the annular member 12 such that both ends of the sheet 11 are opposed to each other in a circumferential direction of the annular member 12. A surface of the sheet 11 is a non-glossy surface 11a which is an exemplary surface with low reflectivity.

It should be noted that in FIG. 3B, in order to make a distinction between the non-glossy surface 11a and the glossy surface 12a, the non-glossy surface 11a is hatched for the sake of convenience. Also, non-glossy surfaces in FIGS. 6A, 6B, 6C, 7A, and 7B, to be described later, as well are hatched for the same reason.

The material of the sheet 11 is not limited. In the sheet 11, a plurality of holes 11b with a predetermined width A are formed side by side at intervals of the width A in a length direction corresponding to the circumferential direction of the annular member 12. Namely, the non-glossy surface 11a between the adjoining holes 11b in the sheet 11 has the width A as well. The length of the sheet 11 is determined in advance so that a gap 12b with a predetermined width B can be formed between both ends opposed to each other in the circumferential direction of the annular member 12. The width B of the gap 12b is set at a value substantially equal to the width A of the hole 11b.

It should be noted that whether or not a surface is glossy is determined depending largely on a personal point of view by a person who see the surface. In the present embodiment, however, a glossy surface and a non-glossy surface are used as a typical combination of surfaces with different reflectivities. As will be described later, in the present embodiment, a beam of light is projected from a light-emitting unit of a photo-reflector, which is an exemplary optical sensor, toward the inner peripheral surface of the rotatable ring 4. Rotation of the rotatable ring 4 is detected based on a signal indicative of whether or not light reflected from the inner peripheral surface of the rotatable ring 4 has been received by a light-receiving unit of the photo-reflector. Accordingly, a glossy surface is used as an exemplary surface which produces reflected light that is receivable by the light-receiving unit of the photo-reflector, and a non-glossy surface is used as an exemplary surface which produces reflected light that is not receivable by the light-receiving unit of the photo-reflector. Thus, the inner peripheral surface of the annular member 12 and the surface of the sheet 11 have only to have such a difference in reflectivity that whether or not reflected light is receivable can be identified using the photo-reflector.

On the inner peripheral surface of the rotatable ring 4, the glossy surface 12a, which is the inner peripheral surface of the annular member 12, exposes itself in respective areas of the holes 11b and the gap 12b. Thus, the glossy surface 12a, which exposes itself in respective areas of the holes 11b and the gap 12b and the non-glossy surface 11a between the adjoining holes 11b of the sheet 11 are provided alternately over the whole circumference of the inner peripheral surface of the rotatable ring 4. In the present embodiment, the holes 11b and the gap 12b are designed to have a width corresponding to four degrees, and an area with the width A between the adjoining holes 11b is also designed to have a width corresponding to four degrees. Thus, the glossy surface 12a and the non-glossy surface 11a are arranged alternately with eight-degree pitches i.e. at intervals of four degrees.

Here, assuming that when a sheet is attached to an inner peripheral surface of an annular member, and end faces of the sheet are joined together without leaving a gap between both ends of the sheet, a minuscule gap may be formed between both ends of the sheet, or there may be a minuscule overlap at both ends of the sheet. On the other hand, by intentionally providing the gap 12b with the width B between both ends of the sheet 11 when the sheet is attached to the inner peripheral surface of the annular member 12, formation of a minuscule gap or overlap between both ends of the sheet 11 is prevented. As a result, as will be described later, false detection is prevented when rotation of the rotatable ring 4 is detected.

In each of FIGS. 3A and 3B, two photo-reflectors 10a and 10b for detecting rotation of the rotatable ring 4 are shown, and in FIG. 3A, a flexible wiring substrate 9 on which the two photo-reflectors 10a and 10b are mounted is shown.

A light-emitting unit and a light-receiving unit of the photo-reflectors 10a and 10b are placed on an inner side of the rotatable ring 4 in a manner facing to an outer peripheral side of the rotatable ring 4. To detect rotation of the rotatable ring 4 using the photo-reflectors 10a and 10b, surfaces with different reflectivities have to be provided at least alternately on the inner peripheral surface of the rotatable ring 4 which is opposed to the photo-reflectors 10a and 10b. Here, as described earlier, the inner peripheral surface of the annular member 12 is finished to be the glossy surface 12a. Accordingly, the distance between the inner peripheral surface of the annular member 12 and the photo-reflectors 10a and 10b is determined so that light projected to the glossy surface 12a from the light-emitting units of the photo-reflectors 10a and 10b and reflected on the glossy surface 12a can be received by the light-receiving units of the photo-reflectors 10a and 10b. On this occasion, a reflectivity of the non-glossy surface 11a which is the surface of the sheet 11 is set at such a reflectivity that light projected to the non-glossy surface 11a from the light-emitting units of the photo-reflectors 10a and 10b and reflected on the non-glossy surface 11a is not detectable by the light-receiving units of the photo-reflectors 10a and 10b. This brings the light-receiving units of the photo-reflectors 10a and 10b to alternately have a light receiving state and a non-light receiving state and makes it possible to send signals indicating the light receiving state and the non-light receiving state to the signal processing circuit, not shown, which the image pickup apparatus 1 has.

Figure 4:
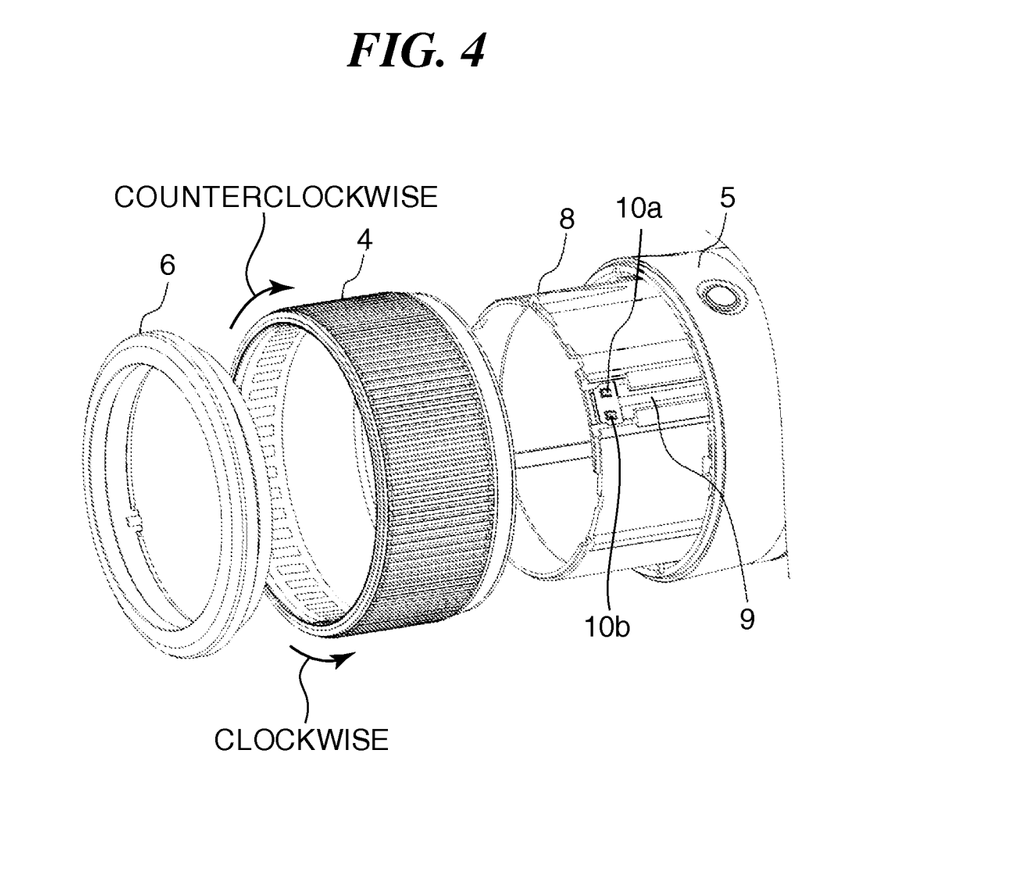
FIG. 4 is an exploded perspective view showing the cylindrical unit constituting the image pickup apparatus in FIG. 1.

A description will now be given of how a rotation angle is detected when the rotatable ring 4 is rotated. FIG. 4 is an exploded perspective view showing the cylindrical unit 1b and shows the rotatable ring 4 and members around it. The flexible wiring substrate 9 is fixed to the base member 8, and the two photo-reflectors 10a and 10b are mounted on the flexible wiring substrate 9. The pitch with which the photo-reflectors 10a and 10b are disposed is determined so that as shown in FIG. 3B, when one is placed at a position opposed to substantially the center of the glossy surface 12a (the area of the hole 11b or the gap 12b), the other one can be placed at a position opposed to a boundary between the glossy surface 12a and the non-glossy surface 11a. This maximizes a phase difference between signal waveforms output from the two photo-reflectors 10a and 10b.

To detect a rotational direction of the rotatable ring 4, there needs to be a phase difference between signal waveforms output from the two photo-reflectors 10a and 10b. Namely, when the photo-reflector 10a has received light, whether or not the photo-reflector 10b has received light needs to vary according to rotational directions of the rotatable ring 4. Based on the differences, a direction in which the rotatable ring 4 is rotating is determined using the signal processing circuit.

Figure 5A:
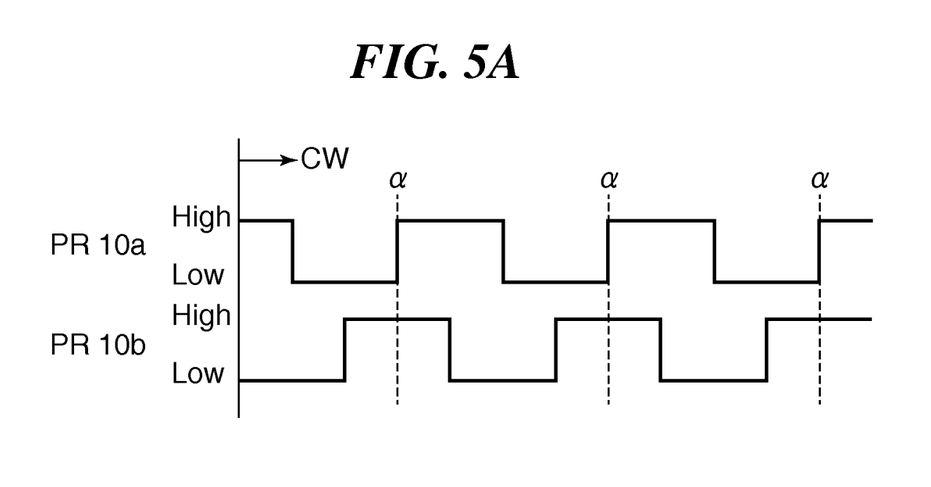
FIG. 5A is a view showing exemplary signal waveforms output from photo-reflectors when the rotatable ring in FIG. 4 is rotated clockwise.
Figure 5B:
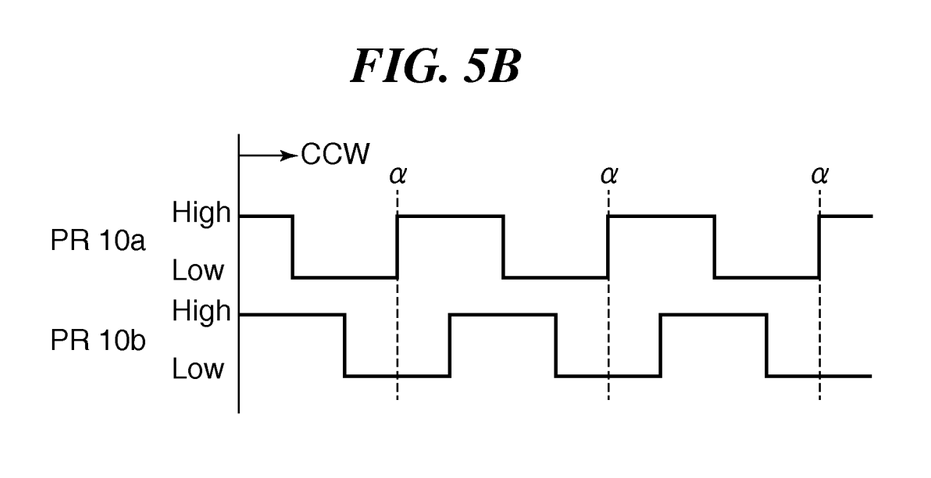
FIG. 5B is a view showing exemplary signal waveforms output from the photo-reflectors when the rotatable ring in FIG. 4 is rotated counterclockwise.

FIG. 5A shows signal waveforms output from the photo-reflectors 10a and 10b when the rotatable ring 4 is rotated in a clockwise direction (CW) (see FIG. 4) as seen from behind the image pickup apparatus 1. FIG. 5B shows signal waveforms output from the photo-reflectors 10a and 10b when the rotatable ring 4 is rotated in a counterclockwise (CCW) direction (see FIG. 4) which is opposite to the clockwise direction. It should be noted that in FIGS. 5A and 5B, the photo-reflector 10a is designated as PR 10a, and the photo-reflector 10b is designated as PR 10b. When the signal waveforms are high, this indicates that the photo-reflectors 10a and 10b are receiving light, and when the signal waveforms are low, this indicate that the photo-reflectors 10a and 10b are not receiving light.

When there is no phase difference between signal waveforms output from the photo-reflectors 10a and 10b, signal waveforms output from the photo-reflectors 10a and 10b are the same irrespective of which direction the rotatable ring 4 is rotated in, and hence a rotational direction of the rotatable ring 4 cannot be detected. On the other hand, when there is only a small phase difference between signal waveforms output from the photo-reflectors 10a and 10b, determinations as to whether or not there is a phase difference vary, and a rotational direction may be falsely detected.

Accordingly, in the cylindrical unit 1b, signal waveforms output from the photo-reflectors 10a and 10b have a phase difference corresponding to about a half phase. When the rotatable ring 4 is rotated clockwise, the light-receiving state of the light-receiving unit of the photo-reflector 10b changes to (1) high, (2) low, (3) low, and (4) high as the light-receiving unit of the photo-reflector 10a changes to (1) high, (2) high, (3) low, and (4) low. When the rotatable ring 4 is rotated counterclockwise, the light-receiving state of the light-receiving unit of the photo-reflector 10b changes to (1) low, (2) high, (3) high, and (4) low while the light-receiving unit of the photo-reflector 10a changes to (1) high, (2) high, (3) low, and (4) low. When such sequences are followed, a rotational direction of the rotatable ring 4 is detected whatever the timing with which rotation is started. Based on the sequential changes of the photo-reflectors 10a and 10b from (1) to (4) above, the signal processing circuit, not shown, provided in the main body unit 1a determines a rotational angle of the rotatable ring 4, that is, determines that the rotatable ring 4 have rotated one pitch (one period) irrespective of a rotational direction and a rotation starting position.

As described earlier, on the inner peripheral surface of the rotatable ring 4, the glossy surface 12a exposing itself in the holes 11b and the gap 12b and the non-glossy surface 11a of the sheet 11 are provided alternately at intervals of about four degrees over the whole circumference in the circumferential direction. Thus, on the inner peripheral surface of the rotatable ring 4, the glossy surface 12a exposes itself at 45 positions in total. Therefore, rotation of the rotatable ring 4 is detected whenever the rotatable ring 4 is rotated eight degrees. In FIGS. 5A and 5B, an interval between adjoining rising edges α of a signal from the photo-reflector 10a corresponds to an 8-degree turn of the rotatable ring 4.

As described above, the rotatable ring 4 is manufactured so that all of the area where the sheet 11 is attached on the inner peripheral surface of the annular member 12 can be the glossy surface 12a. For this reason, molding and machining are easier than in a case where reflective surfaces with different reflectivities are directly formed on the inner peripheral surface of the annular member 12, and this reduces manufacturing costs. Moreover, the sheet 11 of which the surface is the non-glossy surface 11a and having the holes 11b with the width A formed side by side at intervals of the width A is attached to the inner peripheral surface of the annular member 12. This forms the gap 12b, which has the width B substantially equal to the width A, between both ends of the sheet 11 opposed to each other in the circumferential direction and exposes the glossy surface 12a. As a result, a rotation angle and a rotational direction of the rotatable ring 4 are accurately detected without false detection, and by extension the reliability of the image pickup apparatus 1 is improved.

Figure 6A:
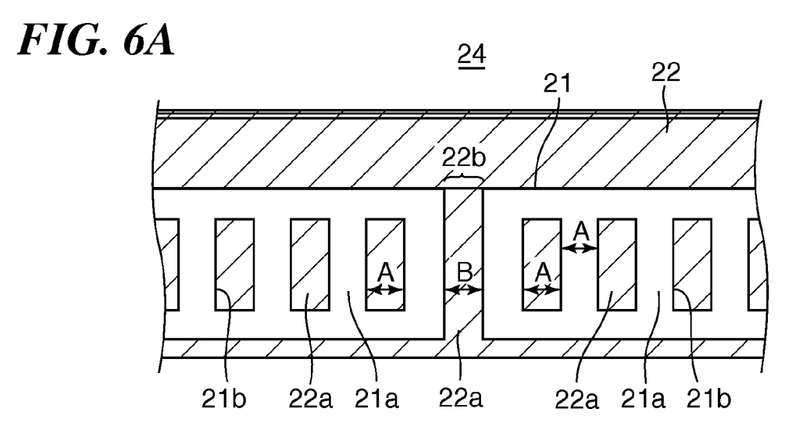
FIG. 6A is a developed plan view showing an inner peripheral surface of a rotatable ring according to a second embodiment of the invention.

Referring next to FIG. 6A, a description will be given of a rotatable operating member according to a second embodiment of the invention. FIG. 6A is a developed plan view showing an inner peripheral surface of a rotatable ring 24 according to the second embodiment of the invention. As will be described below, the rotatable ring 24 has an arrangement in which locations of a glossy surface and a non-glossy surface are the reverse of those on the inner peripheral surface of the rotatable ring 4 described above.

The rotatable ring 24 has an annular member 22, and a sheet 21 attached to an inner peripheral surface of the annular member 22. The annular member 22 differs from the annular member 12 described above in that its inner peripheral surface is formed as a non-glossy surface 22a, but other arrangements are the same as those of the annular member 12 described above.

In the sheet 21, a plurality of holes 21b with a predetermined width A are formed side by side at intervals of the width A in a length direction corresponding to a circumferential direction of the annular member 22. A surface of the sheet 21 is a glossy surface 21a. A gap 22b with a width B is formed between both ends opposed to each other in the circumferential direction with the sheet 21 attached to the annular member 22. In the rotatable ring 24, the non-glossy surface 22a of the annular member 22 exposes itself in areas of the holes 21b with the width A formed in the sheet 21 and the gap 22b with the width B formed between both ends opposed to each other in the circumferential direction. It should be noted that the sheet 21 is configured such that the width B is substantially equal to the width A. Definitions of the glossy surface 21a and the non-glossy surface 22a provided on the inner peripheral surface are the same as those in the first embodiment described above.

When the rotatable ring 24 is applied to the cylindrical unit 1b, the glossy surface 21a of the sheet 21 is controlled to have such a reflectivity that light reflected from the glossy surface 21a when light is projected from the light-emitting units of the photo-reflectors 10a and 10b to the glossy surface 21a is detectable by the light-receiving units of the photo-reflectors 10a and 10b. On the other hand, the non-glossy surface 22a of the annular member 22 is controlled to have such a reflectivity that light reflected from the non-glossy surface 22a when light is projected from the light-emitting units of the photo-reflectors 10a and 10b to the non-glossy surface 22a is not detectable by the light-receiving units of the photo-reflectors 10a and 10b. As a result, glossy surfaces and non-glossy surfaces with the width A are practically formed in an alternate manner at intervals of the width A over the whole circumference of the inner peripheral surface of the rotatable ring 24.

Therefore, waveform signals obtained from the photo-reflectors 10a and 10b when the rotatable ring 24 is rotated are waveform signals with phases shifted a half period as described above with reference to FIGS. 5A and 5B. Thus, a rotation angle and a rotational direction of the rotatable ring 24 when it is rotated are detectable as with an angle of rotation and a rotational direction of the rotatable ring 4 according to the first embodiment when it is rotated. As a result, the rotatable ring 24 as well obtains the same effects as those obtained by the rotatable ring 4.

Figure 6B:
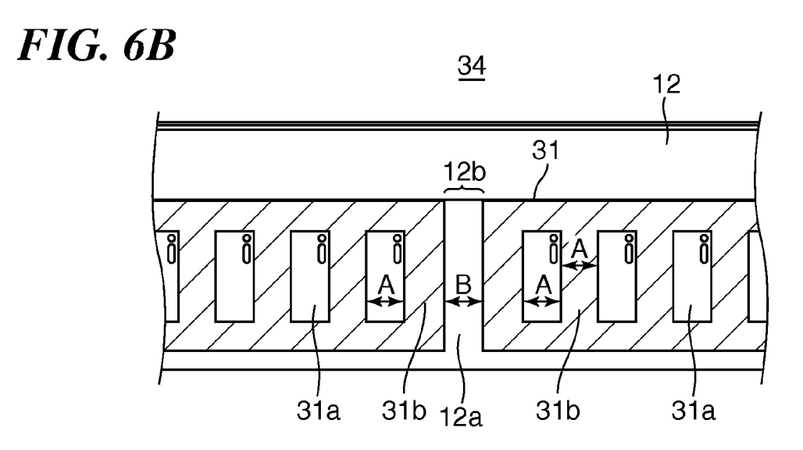
FIG. 6B is a developed plan view showing an inner peripheral surface of a rotatable ring according to a third embodiment of the invention.

Referring next to FIG. 6B, a description will be given of a rotatable operating member according to a third embodiment of the invention. FIG. 6B is a developed plan view showing an inner peripheral surface of a rotatable ring 34 according to the third embodiment of the invention. The rotatable ring 34 has an annular member 12, and a sheet 31 attached to an inner peripheral surface of the annular member 12. The annular member 12 is the same as the annular member 12 of the first embodiment described above, and an inner peripheral surface of the annular member 12 is a glossy surface 12a.

The sheet 31 is configured such that a non-glossy surface 31b with a width A, which is a first reflective area, and a glossy surface 31a with the width A, which is a second reflective area, are alternately formed side by side in a length direction of the sheet 31 corresponding to the circumferential direction of the annular member 12. In the sheet 31, the glossy surface 31a is caught between parts of the non-glossy surface 31b in a width direction (vertical direction as viewed in FIG. 6B) perpendicular to the length direction, but the non-glossy surface 31b at ends in the width direction should not always be needed.

As the sheet 31, one obtained by forming the glossy surface 31a on a sheet with the whole surface thereof being the non-glossy surface 31b by printing or the like, or one obtained by forming the non-glossy surface 31b on a sheet with the whole surface thereof being the glossy surface 31a by printing or the like may be used, but this is not limitative.

A gap 12b with a width B is formed between both ends of the sheet 31 opposed to each other in the circumferential direction of the annular member 12 with the sheet 31 attached to the inner peripheral surface of the annular member 12. The sheet 31 is configured such that the width B is substantially equal to the width A.

A description will now be given of the relationship among reflectivities of the glossy surface 31a and the non-glossy surface 31b of the surface of the sheet 31 and a reflectivity of the glossy surface 12a of the inner peripheral surface of the annular member 12. There needs to be a difference in reflectivity between the glossy surface 31a and the non-glossy surface 31b so that the photo-reflectors 10a and 10b can receive reflected light from the glossy surface 31a but cannot receive reflected light from the non-glossy surface 31b. The gap 12b in which the glossy surface 12a exposes itself needs to be sandwiched by the non-glossy surface 31b in the circumferential direction of the annular member 12. There needs to be a difference in reflectivity between the glossy surface 12a and the non-glossy surface 31b as well so that the photo-reflectors 10a and 10b can receive reflected light from the glossy surface 12a but cannot receive reflected light from the non-glossy surface 31b. Accordingly, reflectivities of the glossy surface 31a, the non-glossy surface 31b, and the glossy surface 12a are determined so that a difference in reflectivity between the glossy surface 12a and the glossy surface 31a can be smaller than a difference in reflectivity between the non-glossy surface 31b and the glossy surface 31a. As a result, waveform signals obtained from the photo-reflectors 10a and 10b when the rotatable ring 34 is rotated can be made equivalent to the waveform signals described with reference to FIGS. 5A and 5B.

For example, the glossy surface 12a is controlled to have such a reflectivity that light reflected from the glossy surface 12a when light is projected from the light-emitting units of the photo-reflectors 10a and 10b to the glossy surface 12a is detectable by the light-receiving units of the photo-reflectors 10a and 10b. The glossy surface 31a of the sheet 31 is controlled to have a reflectivity equal to that of the glossy surface 12a. On the other hand, the non-glossy surface 31b of the sheet 31 is controlled to have such a reflectivity that light reflected from the non-glossy surface 31b when light is projected from the light-emitting units of the photo-reflectors 10a and 10b to the non-glossy surface 31b is not detectable by the light-receiving units of the photo-reflectors 10a and 10b.

Thus, a rotation angle and a rotational direction of the rotatable ring 34 when it is rotated are detectable as with a rotation angle and a rotational direction of the rotatable ring 4 according to the first embodiment when it is rotated. As a result, the rotatable ring 34 as well obtains the same effects as those obtained by the rotatable ring 4.

Figure 6C:
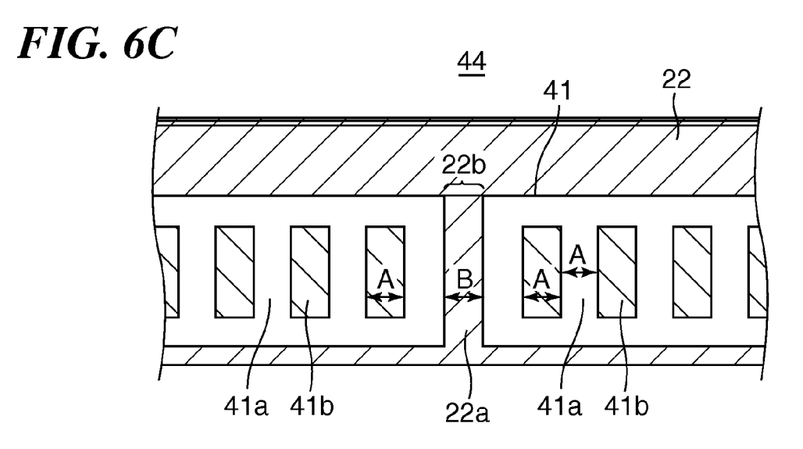
FIG. 6C is a developed plan view showing an inner peripheral surface of a rotatable ring according to a fourth embodiment of the invention.

Referring next to FIG. 6C, a description will be given of a rotatable operating member according to a fourth embodiment of the invention. FIG. 6C is a developed plan view showing an inner peripheral surface of a rotatable ring 44 according to the fourth embodiment of the invention. The rotatable ring 44 has an annular member 22, and a sheet 41 attached to an inner peripheral surface of the annular member 22. The annular member 22 is the same as the annular member 22 of the second embodiment described above, and an inner peripheral surface of the annular member 22 is a non-glossy surface 22a.

The sheet 41 is configured such that a glossy surface 41a with a width A, which is a first reflective area, and a non-glossy surface 41b with the width A, which is a second reflective area, are alternately formed side by side in a length direction of the sheet 41 corresponding to the circumferential direction of the annular member 22. In the sheet 41, the non-glossy surface 41b is caught between parts of the glossy surface 41a in a width direction (vertical direction as viewed in FIG. 6C) perpendicular to the length direction, but the glossy surface 41a at ends in the width direction should not always be needed.

As the sheet 41, one obtained by forming the non-glossy surface 41b on a sheet with the whole surface thereof being the glossy surface 41a by printing or the like, or one obtained by forming the glossy surface 41a on a sheet with the whole surface thereof being the non-glossy surface 41b by printing or the like may be used, but this is not limitative.

A gap 22b with a width B is formed between both ends of the sheet 41 opposed to each other in the circumferential direction of the annular member 22 with the sheet 41 attached to an inner peripheral surface of the annular member 22. The sheet 41 is configured such that the width B is substantially equal to the width A.

The relationship among reflectivities of the glossy surface 41a and the non-glossy surface 41b of the surface of the sheet 41 and a reflectivity of the non-glossy surface 22a of the inner peripheral surface of the annular member 22 is the same as the relationship according to the third embodiment described above among reflectivities of the glossy surface 31a and the non-glossy surface 31b of the surface of the sheet 31 and a reflectivity of the glossy surface 12a of the inner peripheral surface of the annular member 12. Accordingly, reflectivities of the glossy surface 41a, the non-glossy surface 41b, and the non-glossy surface 22a are determined so that a difference in reflectivity between the non-glossy surface 22a and the non-glossy surface 41b can be smaller than a difference in reflectivity between the non-glossy surface 41b and the glossy surface 41a. As a result, waveform signals obtained from the photo-reflectors 10a and 10b when the rotatable ring 44 is rotated are equivalent to waveform signals with phases shifted a half period as described above with reference to FIGS. 5A and 5B.

For example, the glossy surface 41a of the sheet 41 is controlled to have such a reflectivity that light reflected from the glossy surface 41a when light is projected from the light-emitting units of the photo-reflectors 10a and 10b to the glossy surface 41a is detectable by the light-receiving units of the photo-reflectors 10a and 10b. On the other hand, the non-glossy surface 22a exposed from the gap 22b between both ends of the sheet 41 is controlled to have such a reflectivity that light reflected from the non-glossy surface 22a when light is projected from the light-emitting units of the photo-reflectors 10a and 10b to the non-glossy surface 22a is not detectable by the light-receiving units of the photo-reflectors 10a and 10b. The non-glossy surface 41b of the sheet 41 is controlled to have a reflectivity equal to that of the non-glossy surface 22a.

Thus, a rotation angle and a rotational direction of the rotatable ring 44 when it is rotated are detectable as with a rotation angle and a rotational direction of the rotatable ring 4 according to the first embodiment when it is rotated. As a result, the rotatable ring 44 as well obtains the same effects as those obtained by the rotatable ring 4.

Figure 7A:
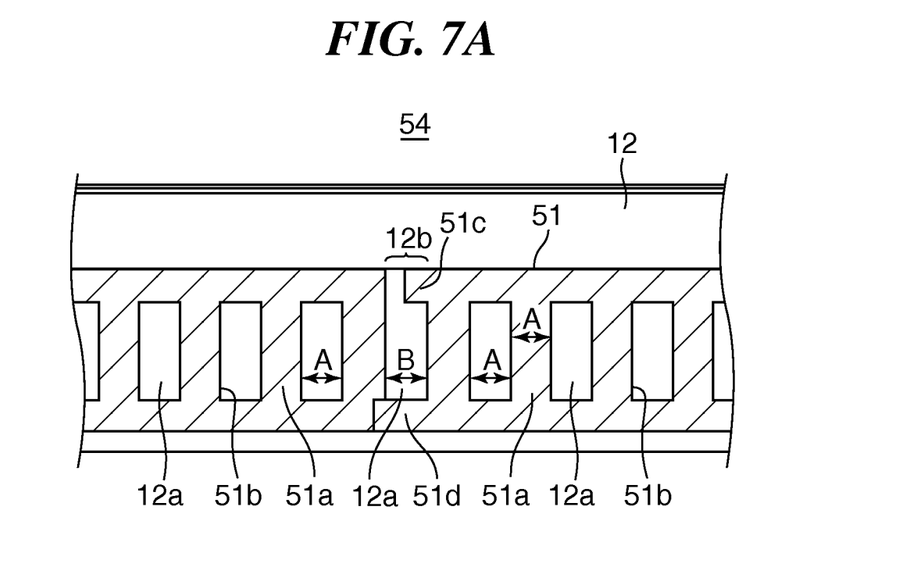
FIG. 7A is a developed plan view showing an inner peripheral surface of a rotatable ring according to a fifth embodiment of the invention.

Referring next to FIG. 7A, a description will be given of a rotatable operating member according to a fifth embodiment of the invention. FIG. 7A is a developed plan view showing an inner peripheral surface of a rotatable ring 54 according to the fifth embodiment of the invention. The rotatable ring 54 has an annular member 12, and a sheet 51 attached to an inner peripheral surface of the annular member 12. The annular member 12 is the same as the annular member 12 of the first embodiment described above, and an inner peripheral surface of the annular member 12 is a glossy surface 12a. Detailed description of the annular member 12 is omitted.

A surface of the sheet 51 is a non-glossy surface 51a. In the sheet 51, a plurality of holes 51b with a width A are formed side by side at intervals of the width A in a length direction corresponding to the circumferential direction of the annular member 12 as with the sheet 11 of the first embodiment described above. A gap 12b with a width B is formed between both ends opposed to each other in the circumferential direction of the annular member 12 with the sheet 51 attached to the annular member 12. The sheet 51 is configured such that the width B is substantially equal to the width A.

A first convex portion 51c and a second convex portion 51d projecting in the length direction are provided on one end face of the sheet 51 in the length direction. The first convex portion 51c and the second convex portion 51d are provided at such positions that they are not aligned with the plurality of holes 51b in the length direction of the sheet 51. Specifically, the first convex portion 51c and the second convex portion 51d are provided at respective ones of both ends (upper and lower ends as viewed in FIG. 7A) in a width direction perpendicular to the length direction of the sheet 51, and the holes 51b are provided in midsections in the width direction. Thus, the extent to which the glossy surface 12a exposes itself in the gap 12b and the extent to which the glossy surface 12a exposes itself in each of the holes 51b are made equal, and hence rotation of the rotatable ring 54 is detected by the photo-reflectors 10a and 10b without any trouble. When the sheet 51 is attached to the inner peripheral surface of the annular member 12, the first convex portion 51c and the second convex portion 51d each project toward the other end face of the sheet 51.

A projecting length of the first convex portion 51c is shorter than the width A of the hole 51b and longer than half the width A (A/2). A projecting length of the second convex portion 51d is longer than the width A of the hole 51b and shorter than 1.5 times the width A. For this reason, with the sheet 51 attached to the inner peripheral surface of the annular member 12, the first convex portion 51c does not overlap the other end face of the sheet 51 to which the first convex portion 51c is opposed in the circumferential direction, but the second convex portion 51d overlaps the other end face of the sheet 51 to which the second convex portion 51d is opposed in the circumferential direction.

The first convex portion 51c and the second convex portion 51d are indexes for determining whether or not the sheet 51 has been properly attached to the inner peripheral surface of the annular member 12. For example, when the first convex portion 51c overlaps the end of the sheet 51 to which the first convex portion 51c is opposed, this implies that a part of the sheet 51 is not seated on the inner peripheral surface of the annular member 12, and the width B of the gap 12b between both ends of the sheet 51 is narrower than the width A of the hole 51b formed in the sheet 51. In this case, it is necessary to reattach the sheet 51 since a rotation angle and a rotational direction of the rotatable ring 54 may not be accurately detected.

On the other hand, when the second convex portion 51d does not overlap the end of the sheet 51 to which the second convex portion 51d is opposed, this implies that the sheet 51 is twisted on the inner peripheral surface of the annular member 12, and the width B of the gap 12b between both ends of the sheet 51 is wider than the width A of the hole 51b formed in the sheet 51. In this case as well, it is necessary to reattach the sheet 51 since a rotation angle and a rotational direction of the rotatable ring 54 may not be accurately detected.

The rotatable ring 54 obtains the same effects as those obtained by the rotatable ring 4, and whether or not the sheet 51 is attached as prescribed is determined in a simple way.

It should be noted that the projecting lengths of the first convex portion 51c and the second convex portion 51d are determined within the ranges described above with consideration given to variations in parts such as dimension errors. Specifically, when variations in parts such as dimension errors are large, the width B of the gap 12b formed between both ends of the sheet 51 in the length direction needs to be made close to the width A of the hole 51b to the extent possible. Namely, the projecting lengths of the first convex portion 51c and the second convex portion 51d need to be made close to the width A. In this case, an acceptable amount of misalignment of the attached sheet 51 is small.

On the other hand, when variations in parts such as dimension errors are small, a phase difference between waveform signals output from the photo-reflectors is allowed to be inside such an acceptable range that no false detection occurs even if there is some difference between the width B of the gap 12B formed between both ends of the sheet 51 in the length direction and the width A of the hole 51b. As a result, the length of the first convex portion 51c is made close to half the width A of the hole 51b, and the length of the second convex portion 51d is made close to 1.5 times the width A. In this case, an acceptable amount of misalignment of the attached sheet 51 is large.

Convex portions equivalent to the first convex portion 51c and the second convex portion 51d may be provided on the sheets 21, 31, and 41 described with reference to FIGS. 6A, 6B, and 6C. Although in the rotatable ring 54, the first convex portion 51c and the second convex portion 51d are formed on one end face of the sheet 51 in the length direction, this is not limitative, but the first convex portion 51c may be formed on one end face, and the second convex portion 51d may be formed on the other end face. In this case, the first convex portion 51c and the second convex portion 51d are arranged not to overlap each other in the circumferential direction of the annular member 12. Further, just as the glossy surface and the non-glossy surface of the rotatable ring 24 are the reverse of those of the rotatable ring 4, the glossy surface and the non-glossy surface of the rotatable ring 54 may be reversed.

Figure 7B:
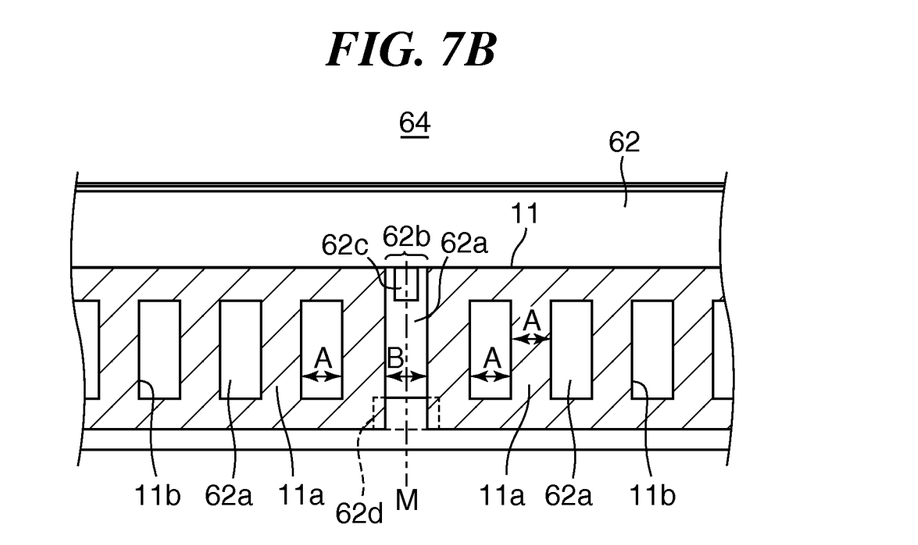
FIG. 7B is a developed plan view showing an inner peripheral surface of a rotatable ring according to a sixth embodiment of the invention.

Referring next to FIG. 7B, a description will be given of a rotatable operating member according to a sixth embodiment of the invention. FIG. 7B is a developed plan view showing an inner peripheral surface of a rotatable ring 64 according to the sixth embodiment of the invention. The rotatable ring 64 has an annular member 62, and a sheet 11 attached to an inner peripheral surface of the annular member 62. The sheet 11 is the same as the sheet 11 of the first embodiment described above, and hence detailed description thereof is omitted. A gap 62b with a predetermined width B is formed between both ends of the sheet 11 in a length direction with the sheet 11 attached to the inner peripheral surface of the annular member 62.

The inner peripheral surface of the annular member 62 is a glossy surface 62a as with the glossy surface 12a of the annular member 12. A first marker 62c and a second marker 62d are formed on the inner peripheral surface of the annular member 62. Referring to FIG. 7B, the first marker 62c and the second marker 62d have a rectangular shape, but this is not limitative. The first marker 62c and the second marker 62d are, for example, concaved portions formed in the annular member 62, but this is not limitative, and they may be formed by inscription or printing (coating with ink) or may be formed by attaching seals. Moreover, the first marker 62c and the second marker 62d may be convex portions formed in the annular member 62.

The first marker 62c and the second marker 62d are provided at positions where they are not aligned with a plurality of holes 11b in a circumferential direction of the annular member 62. Specifically, the first marker 62c and the second marker 62d are provided close to respective ones of both ends (upper and lower ends as viewed in FIG. 7B) in a width direction of the sheet 11 attached to the annular member 62. Thus, the extent to which the glossy surface 62a exposes itself in the gap 62b and the extent to which the glossy surface 62a exposes itself in each of the holes 11b are made equal, and hence rotation is detected by the photo-reflectors 10a and 10b of the rotatable ring 64 without any trouble.

In the circumferential direction of the annular member 62, length (width) of the first marker 62c is shorter than the width A of the holes 11b which are formed in the sheet 11, and longer than half the width A (A/2). In the circumferential direction of the annular member 62, a length (width) of the second marker 62d is longer than the width A of the holes 11b and shorter than 1.5 times the width A. For this reason, with the sheet 11 attached to the inner peripheral surface of the annular member 62, the first marker 62c does not overlap the sheet 11 (the first marker 62C is not covered with the sheet 11), but the second marker 62d overlaps the sheet 11 (the second marker 62d is partially covered with the sheet 11).

It should be noted that in the present embodiment, the first marker 62c and the second marker 62d are formed on the annular member 62 such that their centers in the circumferential direction lie on a straight line M parallel to a thrusting direction of the annular member 62. However, the positions at which the first marker 62c and the second marker 62d are formed should not be limited to this. At least the first marker 62c has only to be formed at a position covered by the second marker 62d as seen from the thrusting direction of the annular member 62.

The first marker 62c and the second marker 62d are indexes for determining whether or not the sheet 11 has been properly attached to the inner peripheral surface of the annular member 62, and they are also markers for attaching the sheet 11 to the inner peripheral surface of the annular member 62. For example, when the first marker 62c overlaps the end of the sheet 11 in the length direction, this implies that the sheet 11 is not settled on the annular member 62. At this time, the width B of the gap 62b is narrower than the width A of the holes 11b formed in the sheet 11. In this case, it is necessary to reattach the sheet 11 since a rotation angle and a rotational direction of the rotatable ring 64 may not be accurately detected.

On the other hand, when the second marker 62d does not overlap the end of the sheet 11 in the length direction, this implies that the sheet 11 attached to the inner peripheral surface of the annular member 62 is twisted, and the width B of the gap 62b is wider than the width A of the hole 11b formed in the sheet 11. In this case as well, it is necessary to reattach the sheet 11 since a rotation angle and a rotational direction of the rotatable ring 64 may not be accurately detected.

It should be noted that the lengths (widths) of the first marker 62c and the second marker 62d in the circumferential direction of the annular member 62 are determined within the ranges described above with consideration given to variations in parts such as dimension errors as with the projecting lengths of the first convex portion 51c and the second convex portion 51d.

In the present embodiment, the first marker 62c and the second marker 62d are provided within the width over which the sheet 11 is attached to the annular member 62 in the thrusting direction, this is not limitative, but the first marker 62c and the second marker 62d may be provided at positions shifted in the thrusting direction on the annular member 62.

As described above, the rotatable ring 64 as well obtains the same effects as those obtained by the rotatable ring 4, and whether or not the sheet 11 is attached as prescribed is determined in a simple way.

It should be noted that the rotatable ring 64 may be configured such that the sheet 31 used for the rotatable ring 24 is attached to the inner peripheral surface of the annular member 62. A rotatable ring may be configured such that the first marker 62c and the second marker 62d are formed on the inner peripheral surface of the annular member 62 which is formed as a non-glossy surface, and also, the sheet 21 or 41 is attached to the inner peripheral surface of the annular member 62.

In the embodiments described above, a rotatable operating member in which surfaces with different reflectivities are provided alternately in a circumferential direction on an inner peripheral surface which is one of curved surfaces of an annular member is used. The invention, however, should not be limited to this, but the invention may be applied to a rotatable operating member in which surfaces with different reflectivities are provided alternately in a circumferential direction on an outer peripheral wall surface which is a curved surface of an annular member or a columnar member.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-243242, filed Dec. 1, 2014, and No. 2015-179613, filed Sep. 11, 2015, which are hereby incorporated by reference herein in their entirety.

What is claimed is:

1. A rotatable operating member comprising:
   a member configured to have a circumferential surface; and
   a sheet configured to be fixed to the circumferential surface,
   wherein a reflectivity of a surface of said sheet is different from a reflectivity of the circumferential surface of said member,
   wherein said sheet has a plurality of holes formed side by side in a circumferential direction in the circumferential surface,
   wherein in said sheet, a part of the circumferential surface is exposed from the holes, and said sheet is fixed to the circumferential surface such that both ends of said sheet are opposed to each other in the circumferential direction, and
   wherein a gap with a width in the circumferential direction substantially equal to a width of the hole in the circumferential direction is provided between both ends of said sheet.

2. The rotatable operating member according to claim 1, wherein the reflectivity of the surface of said sheet is lower than the reflectivity of the circumferential surface of said member.

3. The rotatable operating member according to claim 1, wherein the reflectivity of the surface of said sheet is higher than the reflectivity of the circumferential surface of said member.

4. The rotatable operating member according to claim 1, wherein said sheet has a first convex portion and a second convex portion projecting from one end of said sheet toward the other end of said sheet,
   wherein the first convex portion and the second convex portion are not aligned with the plurality of holes in the circumferential direction,
   wherein a projecting length of the first convex portion is shorter than the width of the gap in the circumferential direction,
   wherein a projecting length of the second convex portion is longer than the width of the gap in the circumferential direction, and
   wherein said sheet is fixed to the circumferential surface such that the first convex portion does not overlap the other end of said sheet, and the second convex portion overlaps the other end of said sheet.

5. The rotatable operating member according to claim 1, wherein a first marker and a second marker are formed in the gap on the circumferential surface,
   wherein the first marker and the second marker are not aligned with the plurality of holes in the circumferential direction,
   wherein a width of the first marker in the circumferential direction is shorter than the width of the gap in the circumferential direction,
   wherein a width of the second marker in the circumferential direction is longer than the width of the gap in the circumferential direction, and
   wherein said sheet is fixed to the circumferential surface such that the first marker does not overlap both ends of said sheet, and the second marker overlaps both ends of said sheet.

6. A rotatable operating member comprising:
   a member configured to have a circumferential surface; and
   a sheet configured to be fixed to the circumferential surface,
   wherein said sheet has a first reflective area with a first reflectivity and a second reflective area with a second reflectivity,
   wherein a difference between a reflectivity of the circumferential surface and the second reflectivity is smaller than a difference between the first reflectivity and the second reflectivity,
   wherein said sheet is fixed to the circumferential surface such that the first reflective area and the second reflective area are arranged alternately in the circumferential surface in a circumferential direction, and both ends of said sheet are opposed to each other in the circumferential direction,
   wherein a gap with a width in the circumferential direction substantially equal to a width of the second reflective area in the circumferential direction is provided between both ends of said sheet, and
   wherein the gap is sandwiched by the first reflective areas of said sheet.

7. The rotatable operating member according to claim 6, wherein the first reflectivity is higher than the second reflectivity.

8. The rotatable operating member according to claim 6, wherein the first reflectivity is lower than the second reflectivity.

9. An electronic device comprising:
   a member configured to have a circumferential surface;
   a sheet configured to be fixed to the circumferential surface; and
   an output unit configured to project light toward said sheet, receive light reflected on said sheet, and output a signal based on the received light,
   wherein a reflectivity of a surface of said sheet is different from a reflectivity of the circumferential surface of said member,
   wherein said sheet has a plurality of holes formed side by side in a circumferential direction in the circumferential surface,
   wherein in said sheet, a part of the circumferential surface of is exposed from the holes, and said sheet is fixed to the circumferential surface such that both ends of said sheet are opposed to each other in the circumferential direction, and
   wherein a gap with a width in the circumferential direction substantially equal to a width of the hole in the circumferential direction is provided between both ends of said sheet.

10. The electronic device according to claim 9, wherein the reflectivity of the surface of said sheet is lower than the reflectivity of the circumferential surface of said member.

11. The electronic device according to claim 9, wherein the reflectivity of the surface of said sheet is higher than the reflectivity of the circumferential surface of said member.

12. The electronic device according to claim 9,
wherein said sheet has a first convex portion and a second convex portion projecting from one end of said sheet toward the other end of said sheet,
wherein the first convex portion and the second convex portion are not aligned with the plurality of holes in the circumferential direction,
wherein a projecting length of the first convex portion is shorter than the width of the gap in the circumferential direction,
wherein a projecting length of the second convex portion is longer than the width of the gap in the circumferential direction, and
wherein said sheet is fixed to the circumferential surface such that the first convex portion does not overlap the other end of said sheet, and the second convex portion overlaps the other end of said sheet.

13. The electronic device according to claim 9,
wherein a first marker and a second marker are formed in the gap on the circumferential surface,
wherein the first marker and the second marker are not aligned with the plurality of holes in the circumferential direction,
wherein a width of the first marker in the circumferential direction is shorter than the width of the gap in the circumferential direction,
wherein a width of the second marker in the circumferential direction is longer than the width of the gap in the circumferential direction, and
wherein said sheet is fixed to the circumferential surface such that the first marker does not overlap both ends of said sheet, and the second marker overlaps both ends of said sheet.

14. An electronic device comprising:
a member configured to have a circumferential surface,
a sheet configured to be fixed to the circumferential surface; and
an output unit configured to project light toward said sheet, receive light reflected on said sheet, and output a signal based on the received light,
wherein said sheet includes a first reflective area with a first reflectivity and a second reflective area with a second reflectivity,
wherein a difference between a reflectivity of the circumferential surface and the second reflectivity is smaller than a difference between the first reflectivity and the second reflectivity,
wherein said sheet is fixed to the circumferential surface such that the first reflective area and the second reflective area are arranged alternately in the circumferential surface in a circumferential direction, and both ends of said sheet are opposed to each other in the circumferential direction,
wherein a gap with a width in the circumferential direction substantially equal to a width of the second reflective area in the circumferential direction is provided between both ends of said sheet, and
wherein the gap is sandwiched by the first reflective areas of said sheet.

15. The electronic device according to claim 14, wherein the first reflectivity is higher than the second reflectivity.

16. The electronic device according to claim 14, wherein the first reflectivity is lower than the second reflectivity.

* * * * *